United States Patent [19]
Balser

[11] 4,187,021
[45] Feb. 5, 1980

[54] ADJUSTABLE FLASH BRACKET

[76] Inventor: John L. Balser, 413 New York Ave., McComb City, Pike County, Miss. 39648

[21] Appl. No.: 919,817

[22] Filed: Jun. 28, 1978

[51] Int. Cl.² ............................................. G03B 17/00
[52] U.S. Cl. ..................................... 354/293; 354/82; 362/11; 352/243
[58] Field of Search ........................... 354/81, 82, 293; 352/243; 362/3, 11

[56] References Cited

U.S. PATENT DOCUMENTS 3,893,145   7/1975   King ....................................... 354/293

*Primary Examiner*—Monroe H. Hayes
*Attorney, Agent, or Firm*—Mason, Fenwick & Lawrence

[57] ABSTRACT

An elongated base frame has vertical handles at each end and a camera attachment plate centrally located between the handles. A double parallelogram linkage consisting of a pair of inner parallel links with the links connected to the upper end of one of the handles, a floating swing link and an outer pair of pivotal links connected to a clamp ring provides support for a flash unit positioned in the clamp ring with the linkage system permitting practically universal movement of the flash bracket to a desired position. Another feature involves an umbrella reflector attachment connectable to the clamp ring for permitting use of the unit with reflected light.

19 Claims, 10 Drawing Figures

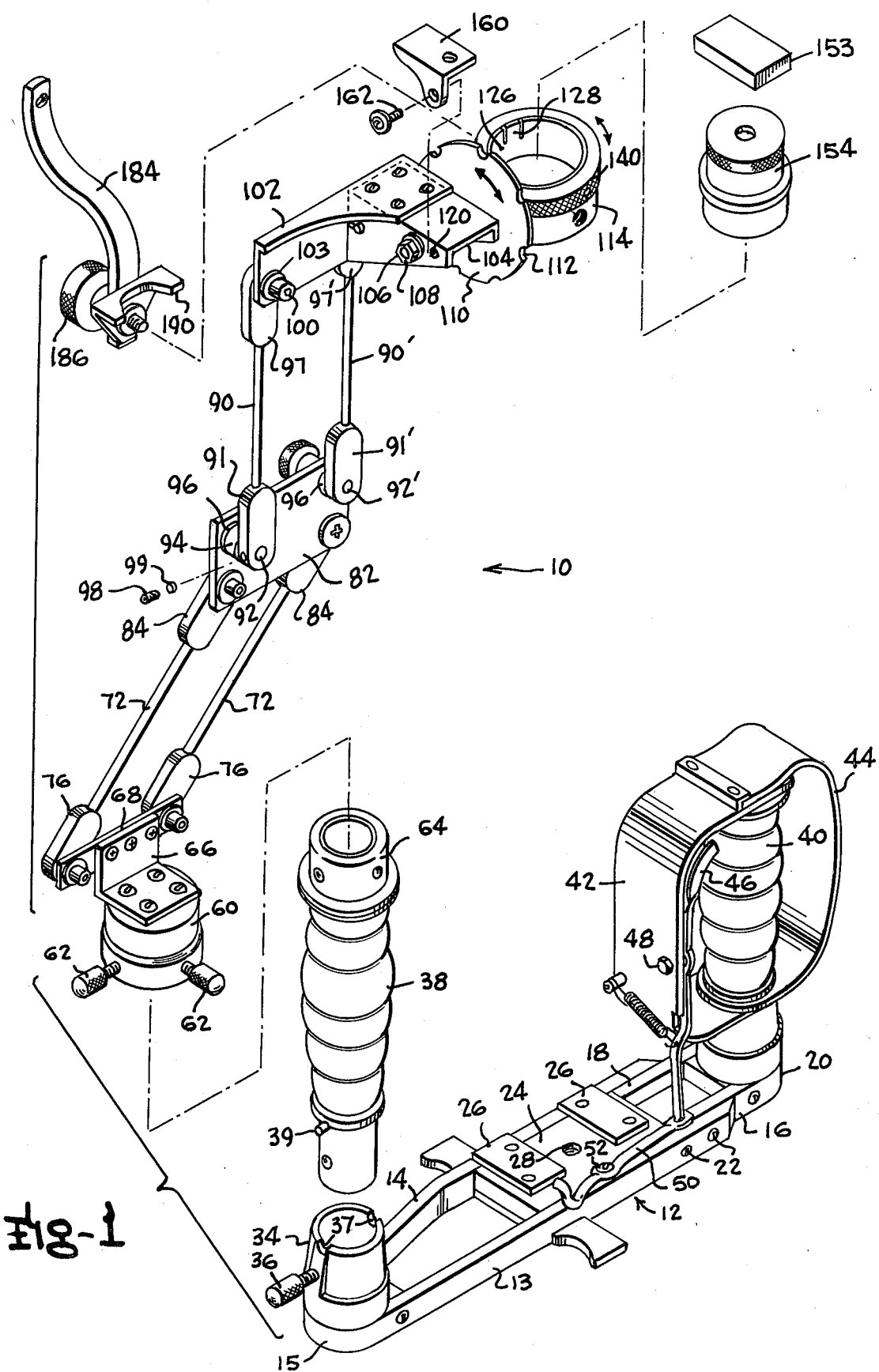

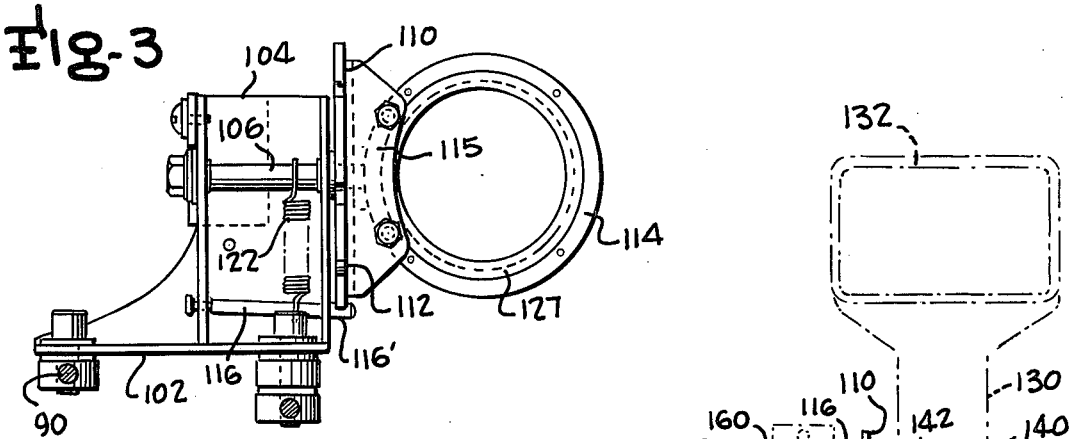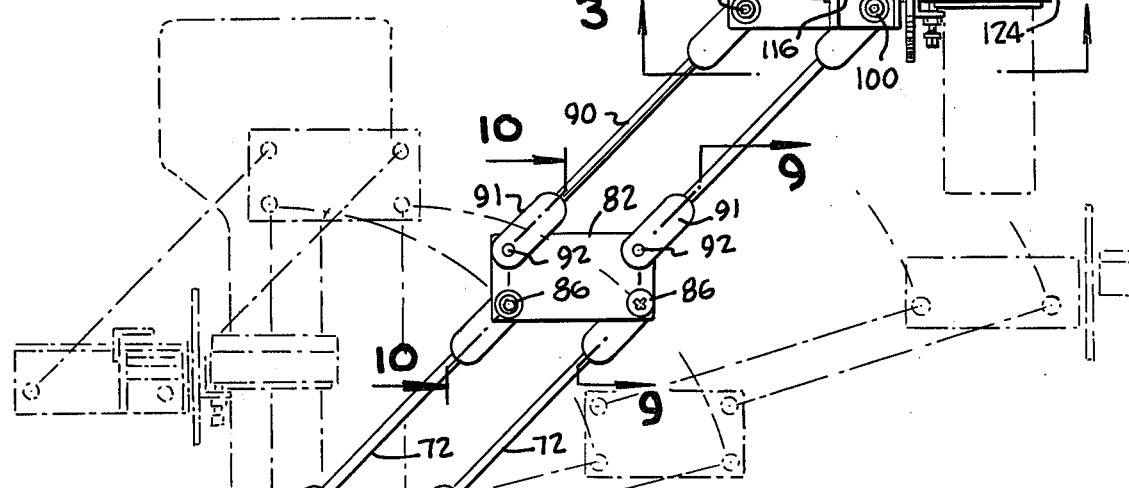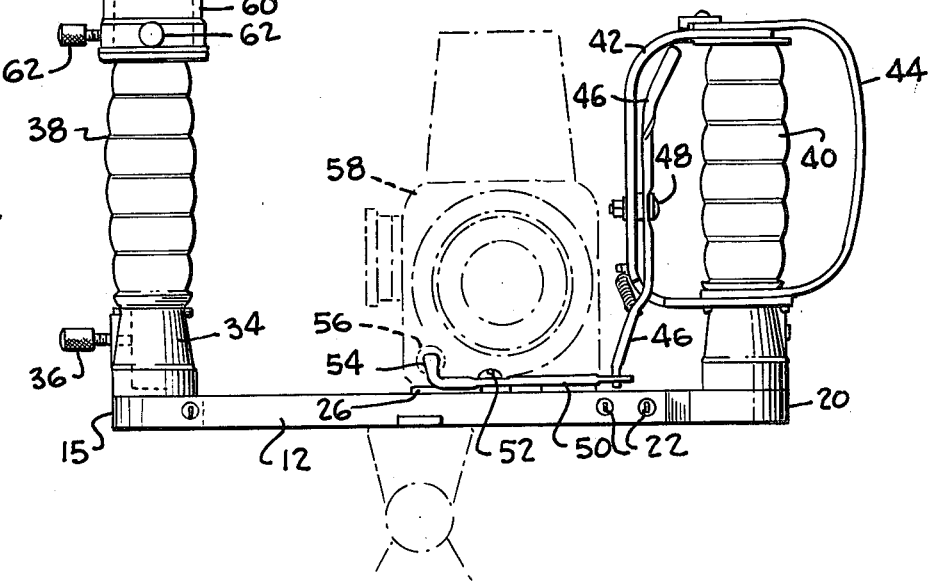

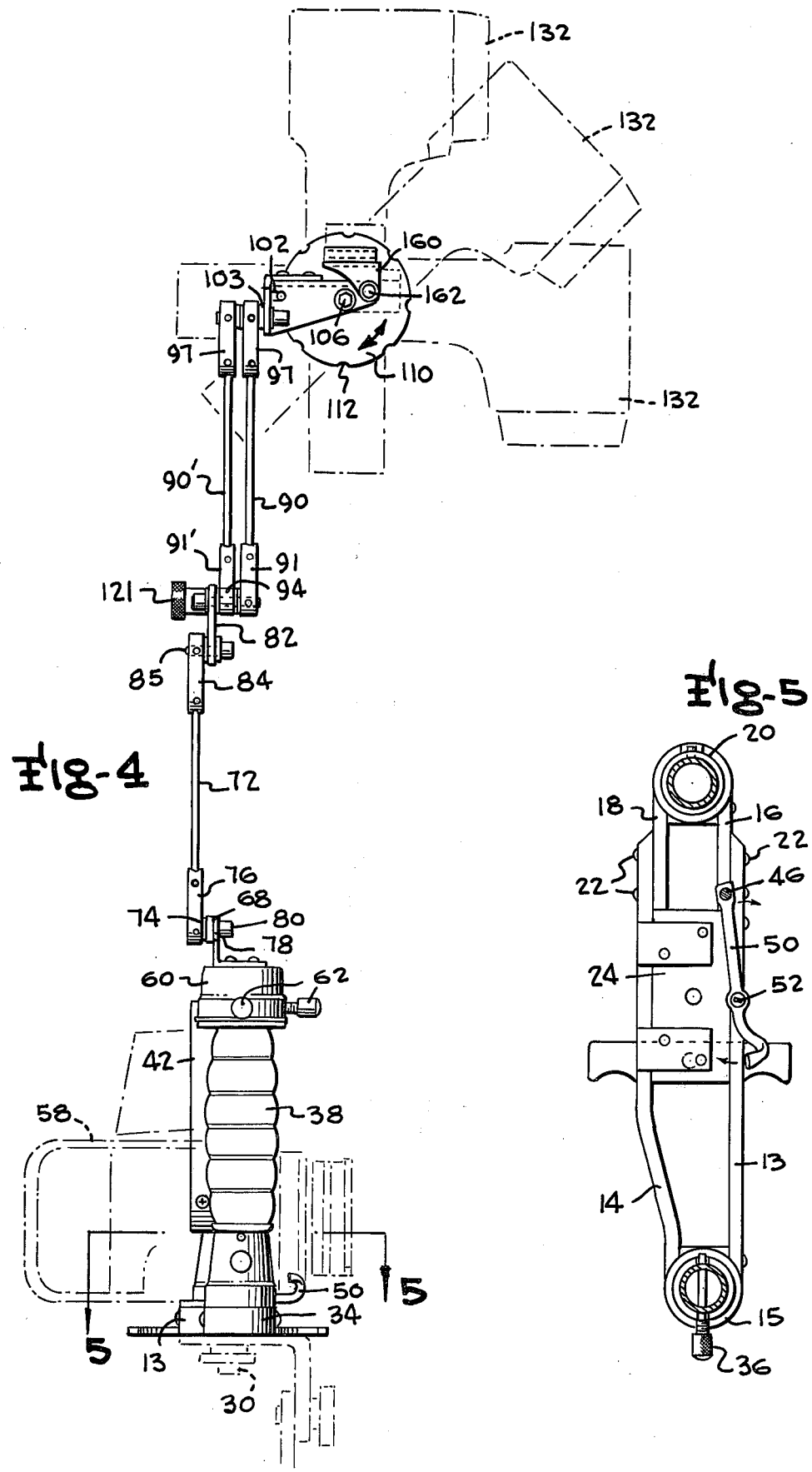

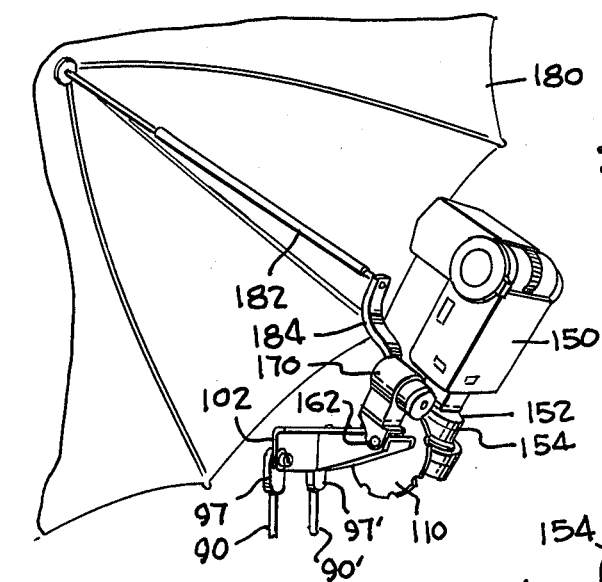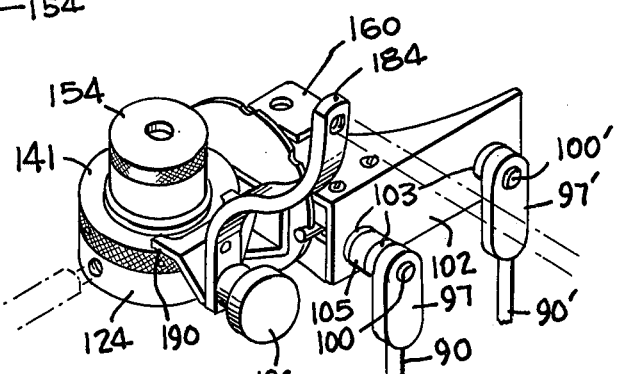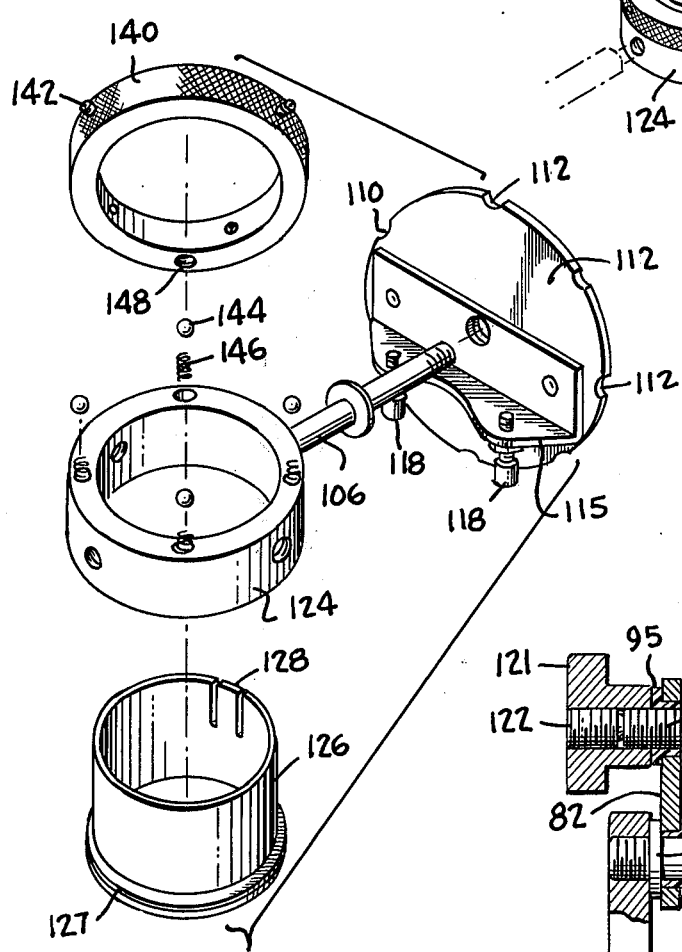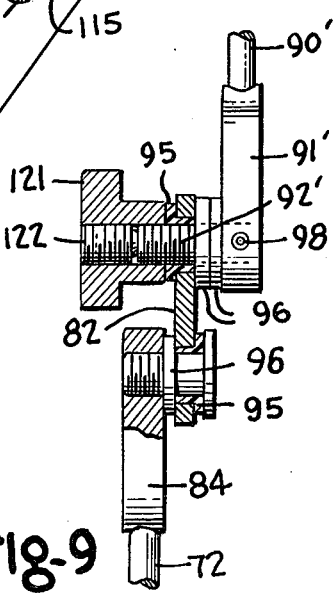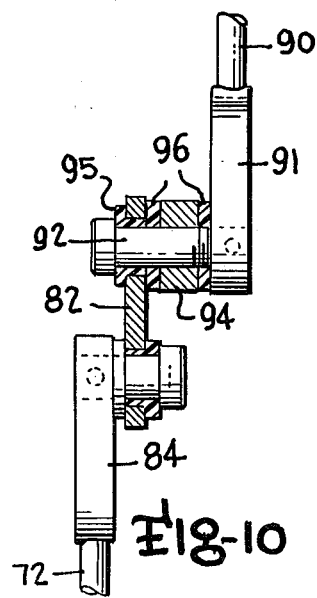

ADJUSTABLE FLASH BRACKET

This invention is in the field of photographic equipment and is more specifically directed to a support bracket for maintaining a camera and flash unit in desired relative positions of adjustment. Additionally, the invention further enables the positioning of a reflector relative to the camera and the flash unit in an adjusted position for achieving desired photographic effects.

It has been long recognized that the achievement of optimum photographic quality when taking pictures of different subjects with a handheld camera and associated flash attachment requires a wide variety of relative positions of the flash unit and the camera depending upon the nature of the subject being photographed. For example, in order to avoid shadows in a bracket, or to hand-hold, the flash unit so that it is aimed toward a ceiling, wall or a diffuser reflector rather than toward the subject so as to provide for a diffused lighting effect on the subject. On the other hand, a particular shadow effect is sometimes desirable and the flash unit must be positioned with respect to the camera in a manner to achieve the desired effect. It is consequently desirable to be able to position the flash unit at any desired position in a plane extending perpendicular to the lens axis at a desired distance from the lens axis with the flash unit also being pivotally positionable about mutually perpendicular axes such as vertical and horizontal axes in order for the camera and associated flash unit to have complete versatility for photographic different types of subjects and/or achieving different photographic effects.

Numerous devices have been proposed for mounting hand-held cameras and flash units together in a unitary manner as evidenced by U.S. Pat. Nos. 2,479,716; 3,168,859; 3,289,563; 3,550,519; 3,575,098; 3,731,897; 3,781,535; 3,855,602; 3,893,145; 4,030,114 and 4,045,808. While many of the previously proposed devices for associating a flash unit with a camera will provide satisfactory results in achieving desired photographic effects of some subjects, they lack the versatility necessary for achieving satisfactory results with the wide variety of subjects and effects encountered by the serious amateur and/or the professional photographer. In addition to failing to provide complete functional versatility, others of the prior known camera-flash unit supports have suffered from being overly heavy and cumbersome in use or in the opposite extreme of being overly delicate and easily susceptibel to damage. Others of the prior known devices for this purpose have been difficult to use in that they require time-consuming manual adjustments for achieving a desired position of the flash unit with respect to the camera; another problem with some of the prior known devices is that the adjustment means sometimes tend to loosen and permit undesired movement of the flash unit from its "adjusted" position. Another drawback of many of the prior known devices in this field has been that they are unbalanced and consequently cumbersome to use.

Therefore, it is the primary object of this invention to provide a new and improved camera-flash unit support.

A further object of the invention is the provision of a new and improved camera-flash unit support in which the flash unit can be positioned in any desired position about the camera lens and tilted it or oriented in any desired direction.

Another object of the invention is the provision of a camera-flash unit support means which maintains the flash unit in an upright position for all positions of swinging adjustment of the unit about the lens axis.

Yet another object of the invention is the provision of a new and improved camera-flash unit support in which the flash unit is easily positionable in any desired position with respect to the camera and is automatically held in the adjusted position without further manipulation.

Achievement of the foregoing and other objects of the invention is enabled by the preferred embodiment of the invention which includes an elongated base frame having parallel vertical handles at each end and a camera connection and support means centrally located between the handles for attachment of any one of a wide variety of conventional cameras. A swing linkage is connected to the upper end of one of the handle members and provides support for an electronic or other type of flash unit attached to the opposite end of the swing linkage.

The swing linkage includes a support member connected to the upper end of one of the handle members providing pivotal support for an inner pair of parallel swing links. The opposite ends of the inner pair of parallel swing links are pivotally connected to a swing plate which in turn includes first and second pivot pins supporting an outer pair of parallel swing links the outer ends of which are connected to a carrier bracket on which a flash unit clamping and mounting means is provided. The flash unit clamping means includes a ring clamp mounted for pivotal tilting movement about a tilt axes perpendicular to the pivot axes of the swing link members. The ring clamp can receive the cylindrical body portion of one type of electronic flash unit and which is clamped in a desired rotary position in the ring clamp or the ring clamp can alternatively receive a cylindrical adaptor on the upper end of which a hot shoe type connector is provided for connection to a compatible mounting shoe on the bottom of a different type of electronic flash unit. Additionally, an umbrella reflector support can be connected to the ring clamp for providing support for an umbrella reflector facing an electronic flash unit in or on the ring clamp. Moreover, a pivotal support bracket mounted on the carrier bracket permits the connection of a separate light sensor mounting means for sensing reflected light from the flash unit.

A better understanding of the preferred embodiment will be achieved when the following written description is considered in conjunction with the appended drawings in which:

FIG. 1 is an exploded perspective view of the preferred embodiment;

FIG. 2 is a front elevation view of the preferred embodiment illustrating different positions of adjustment of the flash unit supporting means in phantom lines;

FIG. 3 is a sectional view taken along lines 3—3 of FIG. 2;

FIG. 4 is a side elevation view of the preferred embodiment illustrating a flash unit in phantom lines in three different positions of tilt adjustment;

FIG. 5 is a sectional view taken along lines 5—5 of FIG. 4;

FIG. 6 is an exploded perspective view of ring clamp means employed for supporting various flash units on the preferred embodiment;

FIG. 7 is a perspective view of the ring clamp means and associated support bracket in conjunction with accessories for supporting a particular type of flash unit and an umbrella reflector;

FIG. 8 is a perspective view of the components of FIG. 7 as viewed from the rear with an umbrella reflector and a flash unit attached thereof;

FIG. 9 is a sectional view taken along lines 9—9 of FIG. 2; and

FIG. 10 is a sectional view taken along lines 10—10 of FIG. 2.

The preferred embodiment of the invention, generally designated 10, comprises an elongated base frame 12 consisting of a first generally U-shaped member having legs 13 and 14 joined by a curved end portion 15 and a second U-shaped member having legs 16 and 18 joined by curved end portion 20 with the leg members 16 and 18 being received within the leg members 13 and 14. Screws 22 hold the U-shaped components in fixed relationship with each other.

Means for permitting the attachment of a camera is provided in a central portion of the elongated base frame 12 consisting of a mounting plate 24 and two pillow plates 26 with an opening 28 in the plate 24 receiving a threaded camera attachment screw 30 (FIG. 4) of the type employed on tripods and which is engageable with a threaded recess in the base of a camera for permitting the connection of the camera to the elongated base frame 12 in an obvious manner. The pillow plates 26 provide stabilized lateral support for the camera attached to the elongated frame member.

Additionally, a hollow handle mounting socket 34 having a clamp screw 36 and diametrically opposed positioning slots 37 is fixedly mounted in the curved end portion 15 of the first U-shaped member. A first elongated handle 38 having positioning pins 39 received in slots 37 is removably mounted in the handle mounting socket 34 and is normally retained therein by the clamping action of screw means 36. A second elongated handle 40 having a longitudinal axis parallel to the longitudinal axis of handle 38 is fixedly positioned in the opposite end of the elongated base frame member 12. The axes of handles 38 and 40 are in a common plane with the longitudinal axis of the elongated base frame 12. Handle 40 includes a rigid metal handguard 42 and a flexible leather or rubber handshield 44. Additionally, a shutter trigger lever 46 is mounted for pivotal movement about a pivot pin 48 on the rigid metal handguard 42 with the lower end of the trigger lever 46 being received in an opening in the end of a rocker lever 50 mounted for pivotal movement on a pivot pin 52 and having an opposite end 54 positioned for engagement with the shutter 56 of a conventional reflex camera 58 illustrated in phantom lines.

A female coupling sleeve 60 having two knurled clamp screws 62 is positioned over a male connector fitting 64 on the upper end of the first elongated handle member 38, as best shown in FIGS. 1 and 2. An angle bracket 66 is attached to the upper end of the female coupling sleeve 60 and provides support for a pivot support plate 68 in which first and second parallel pivot pins 70 are positioned. The pivot pins 70 support a pair of inner parallel swing links 72 fixedly connected to the pins by set screws in end fittings 76. The swing links 72 are consequently supported for pivotal movement in a common plane parallel to the plane of the axes of handles 38 and 40 about the axis of pivot pins 70 to various adjusted positions as shown in phantom outline in FIG. 2. Moreover, each of the pivot links 72 is engaged with a nylon friction washer 74 on pin 70 positioned between an end fitting 76 of the link and the pivot support plate 68; a similar friction washer 78 is provided on the opposite side of the plate 68 with a threaded knurled hex nut 80 being received on the end of the pivot pin 70 so that tightening of the nut 80 increases the frictional effect of the washers 74 and 78. Consequently, the effect of the washers is to hold the first pair of link members 72 in any desired position of adjustment in which they are manually positioned.

Similarly, the upper ends of the inner pair of parallel swing links 72 are provided with end fittings 84 connected to pivot pins 85 in a swing plate 82. Friction washers 83 on each pivot pins 86 are engaged with opposite sides of the swing plate 82 in essentially the same manner as the friction washers 74 and 78 are engaged with plate 68. Consequently, the tightening of nut means on each of the pivot pins 86 adjusts the amount of frictional resistance to pivotal movement of the link members 72 with respect to the floating swing plate 82 so that the swing plate is held in any adjusted position to which it is moved.

An outer pair of parallel swing links comprising links 90 and 90' is pivotally connected by end fittings 91 and 91' to pivot pins 92 and 92' in the upper half of the swing plate 82 with the links 90 and 90' being mounted for movement about the axes of pins 92 and 92' in spaced parallel planes due to the fact that the link 90 is spaced outwardly by a spacer sleeve 94 from the plate 82 by a greater distance than is the link 90' as shown in FIG. 1. Two nylon friction washers 96 and a bushing 95 are positioned on the pivot pin 92 to provide for an adjustable friction engagement to hold the fitting 91 in any desired rotary position of adjustment. The upper ends of the links 90 and 90' are pivotally connected by end fittings 97 and 97' to pivot pins 100 and 100' mounted in a carrier bracket 102 and including friction enhancing nylon washers 103 for providing an adjustable friction connection to the bracket 102. A knurled adjustment knob 121 and a set screw 122 engage shaft 92' for adjustment purposes as shown in FIG. 9. It should be noted that the link 90 spaced outwardly from the swing plate 82 by sleeve 94 is closely adjacent bracket 102 while the other link is spaced from bracket 102 at its upper end by a similar spacer sleeve 105 as shown in FIG. 7. It should also be noted that the fittings 76, 84, 97, 97' and 91' are all connected to their associated support shafts in the same manner that fitting 91 is connected to shaft 92 by a set screw 98 and nylon pad 99 received in an opening in the side of the fitting as shown in FIG. 1.

It will be seen that the pivot support plate 68, links 72 and the swing plate 82 constitute a parallelogram linkage while the links 90 and 90' and carrier bracket 102 cooperate with the swing plate 82 to constitute a second parallelogram linkage which permits swinging movement of the carrier bracket 102 in a plane perpendicular to the axis of the camera lens as illustrated in FIG. 2. The carrier bracket 102 is always retained in position parallel to the longitudinal axis of the elongated base frame 12.

A rearwardly extending cantilever bracket 104 is fixed at its forward end to the carrier bracket 102 and provides support for a pivot shaft 106 held in position by nut means 108. A detent plate 110 having a plurality of radial detents 112 is fixedly connected to the opposite end of pivot shaft 106 and a ring clamp 114 is fixed to the shaft and to the detent plate 110 by an angle bracket 115 on detent plate 110 supporting set screws 118 engaged with opposite portions of a support sleeve component 124 of the ring clamp. A detent latch rod 116 has one end loosely positioned in an opening 120 in the rearwardly extending cantilever bracket 104 with the opposite end 116' being urged inwardly toward and contacting the detent plate 110 by spring means 122 as best shown in FIG. 3.

Support sleeve 124 is connected to the detent plate 110 and the pivot shaft 106 and which provides support for an internal sleeve 126 mounted for rotation in a cylindrical bore provided in the interior of the support sleeve. Internal sleeve 126 is provided with a clamping tongue 128 (FIG. 6) which is capable of being urged inwardly to clamp the cylindrical lower barrel portion 130 of a conventional electronic flash unit 132 positioned within the internal bore of the internal sleeve 126. A knurled ring 140 is fixed to the upper end of the internal sleeve 126 and held in position by set screws 142, so that the knurled ring 140 and internal sleeve 126 are capable of being rotated as a unit in the support sleeve 124. A radial flange 127 on the lower end of the sleeve 127 engages the lower end surface of the support sleeve 124. A plurality of spherical detent walls 144 are urged by miniature springs 146 upwardly against the lower face of the knurled ring 140 and are capable of engagement with a detent recess 148 to permit desired positioning and holding of the clamping assembly 126, 140 etc. in an obvious manner. It should be observed that one of the set screws 142 is aligned with the clamping tongue 128 to urge the clamping tongue inwardly to effect clamping of the barrel 130 of the electronic flash unit 132. Consequently, it will be seen that ring clamp 114 is capable of rotational movement about the axis of pivot shaft 106 which is parallel to the longitudinal axis of the elongated base frame. The pivot shaft 106 consequently constitutes a tilted pivot shaft which permits the electronic light unit 132 to be tilted about the axis of shaft 106 to a desired position such as illustrated in three phantom positions in FIG. 4. The detents in the outer periphery of the detent plate 110 define the desired tilt positions in an obvious manner. Additionally, the electronic light unit 132 can be rotated while in the ring clamp about the axis of the ring clamp elements 126, 140 etc.

It is also possible to mount a different type of electronic flash unit such as Model 283 Vivatar flash unit 150 mounted within the clamp ring 114 as shown in FIG. 8. Electronic flash units such as unit 150 have a hot shoe 152 on the lower end which is slidably received in a mating conventional hot shoe of the type normally provided on the upper surface of many cameras. The inner connection of the hot shoe of the electronic flash unit and the hot shoe of the camera normally provides both a mechanical connection and an electrical connection to the camera for the electronic flash unit. In the present case, the base hot shoe 153 to which the flash unit is connected is mounted on a cylindrical adapter 154 which is clamped in the ring clamp in the same manner as the barrel 150 of the previously discussed flash unit.

Additionally, a hinge bracket 160 is pivotally mounted on pivot pin 162 fitted in the side on the cantilever bracket portion 104 and an attachment fitting 166 is attached to the upper surface of the hinge bracket 160 to permit a conventional light sensor 170 of the type used with the Vivatar Model 283 flash unit, or an equivalent sensor unit to be mounted on bracket 160. An umbrella reflector 180 illustrated in FIG. 8 has a central support rod 182 having an end fitted into a curved bracket 184 capable of being mounted on the support sleeve 124 in a threaded opening therein by means of a knurled connector screw 186. Rotation of the curved bracket element 184 is prevented by engagement of position retaining plate means 190 fixed to the curved member 184 with the upper end surface 141 of the ring 140. Consequently, the flash unit 152 can be positioned to face the umbrella reflector 180 with the light sensor 170 being positioned to face in an exactly opposite direction so facing the object to be photographed. When the unit 150 is fired, the light from the unit is reflected from the umbrella reflector back onto the subject and then back into the sensor 170, which terminates the flash upon sensing of adequate reflected light to provide for a proper exposure.

Numerous modifications of the preferred embodiment will undoubtedly occur to those skilled in the art. For example, a different type of shutter release means such as a cable release can be incorporated in the second handle assembly or use with different types of cameras from that illustrated in FIG. 2. Therefore, it should be understood that the spirit and scope of the invention is to be limited solely by the appended claims.

I claim:
1. A flash bracket for a camera comprising:
an elongated base frame having a longitudinal axis;
first and second elongated handle members mounted on opposite ends of said elongated base frame and having parallel axes in a common plane with and oriented perpendicular to the longitudinal axis of said base frame;
a camera connection and support means on said elongated base frame intermediate said first and second elongated handle members for supporting a camera attached thereto;
a flash support head for releasably supporting a flash unit; and
selectively positionable support means for said flash support head including:
swing linkage means extending between said first elongated handle means and said flash support head for permitting selective positioning of said flash support head in a swing plane parallel to the plane in which the axes of said first and second elongated handle means are located;
head tilt pivot means for permitting said flash support head to be selectively rotated about a tilt axis in a plane parallel to said swing plane to a desired tilt position;
releasable means for maintaining said flash support head in said desired tilt position; and
wherein said swing linkage means includes:
an inner pair of parallel swing links pivotally connected on one end to the upper end of said first elongated handle means for pivotal movement about spaced parallel pivot axes;
a swing plate pivotally connected to the opposite ends of said inner pair of parallel swing links;
an outer pair of swing links pivotally connected at one end to said swing plate for pivotal movement about spaced parallel pivot axes; and
a carrier bracket pivotally connected to the opposite end of said outer pair of parallel swing links, said head tilt pivot means being mounted on said carrier bracket.

2. The invention of claim 1, wherein said first elongated handle member is removably connected to said base frame by a clamp sleeve mounted on one end of said elongated base frame.

3. The invention of claim 1, additionally including a hinge bracket mounted for pivotal movement on said carrier bracket about a pivot axis parallel to said tilt axis and including connector means permitting the attachment of a light sensor to said hinge bracket.

4. The invention of claim 1, wherein said support head includes a ring clamp for receiving and clampingly holding a cylindrical portion of an electronic flash unit in any desired position of rotation about an axis perpendicular to said longitudinal axes of said base frame.

5. The invention of claim 3, additionally including a cylindrical adaptor dimensioned to be received and clamped in said ring clamp and including a hot shoe type connector for connection to a compatible mounting shoe of an electronic flash unit.

6. The invention of claim 5, additionally including an umbrella reflector support removably mounted on said ring clamp.

7. The invention of claim 4, additionally including a removable pivot pin support means removably mounted on the end of said first elongated handle means, first and second pivot pins on said pivot pin support means comprising a portion of the pivotal connection of said inner pair of parallel swing links to said first elongated handle means.

8. The invention of claim 1, wherein said inner pair of parallel swing links are supported for pivotal movement in common plane and said outer pair of parallel swing links are supported for pivotal movement in spaced parallel planes.

9. The invention of claim 1, wherein the pivotal connection of said inner pair of swing links to said elongated handle is provided by means including adjustable friction providing washer means providing friction force tending to hold said inner pair of swing links in any adjusted position.

10. The invention of claim 9, wherein the pivotal connection of said swing plate to the inner pair of parallel swing links is provided by means including adjustable friction providing washers providing a friction force tending to hold said swing plate and said inner pair of parallel swing links in any adjusted position.

11. The invention of claim 10, wherein the pivotal connection of said swing plate to the outer pair of parallel swing links includes friction providing washers providing friction force tending to hold said outer pair of parallel swing links in any adjusted position with respect to said swing plate.

12. The invention of claim 11, wherein the pivotal connection of the outer ends of said outer pair of parallel swing links to said carrier bracket includes friction adjustable friction providing washers providing friction force tending to hold said carrier bracket and said outer pair of parallel swing links in any adjusted position with respect to each other.

13. A flash bracket for a camera comprising:
an elongated base frame having a longitudinal axis;
first and second elongated handle members mounted on opposite ends of said elongated basd frame and having parallel axes in a common plane with and oriented perpendicular to the longitudinal axis of said base frame;
a camera connection and support means on said elongated base frame intermediate said first and second elongated handle members for supporting a camera attached thereto;
a flash support head for releasably supporting a flash unit; and
selectively positionable support means for said flash support head including:
swing linkage means extending between said first elongated handle means and said flash support head for permitting selective positioning of said flash support head in a swing plane parallel to the plane in which the axes of said first and second elongated handle means are located;
head tilt pivot means for permitting said flash support head to be selectively rotated about a tilt axis in a plane parallel to said swing plane to a desired tilt position;
releasable means for maintaining said flash support head in said desired tilt position; and
wherein said swing linkage means includes: an inner pair of parallel swing links pivotally connected on one end to the upper end of said first elongated handle means for pivotal movement in a common plane about a first pair of spaced parallel pivot axes perpendicular to the longitudinal axis of said base frame;
a swing plate pivotally connected to the opposite ends of said inner pair of parallel swing links;
an outer pair of swing links pivotally connected at one end to said swing plate for pivotal movement about a second pair of spaced parallel pivot axes parallel to said first pair of spaced parallel pivot axes;
a carrier bracket pivotally connected to the opposite end of said outer pair of parallel swing links, said head tilt pivot means being mounted on said carrier bracket; and
wherein said flash support head includes ring clamp means selectively operable for supporting a flash unit.

14. The invention of claim 13, additionally including a hinge bracket mounted for pivotal movement on said carrier bracket about a pivot axis parallel to said tilt axis and including connector means permitting the attachment of a light sensor to said hinge bracket.

15. The invention of claim 14, additionally including a cylindrical adaptor dimensioned to be received and clamped in said ring clamp and including a hot shoe type connector for connection to a compatible mounting shoe of an electronic flash unit.

16. The invention of claim 13, wherein said outer pair of swing links are positioned in different parallel planes.

17. The invention of claim 16, wherein the pivotal connection of said inner pair of swing links to said elongated handle is provided by means including friction providing washer means providing a manually overcomeable friction force tending to hold said inner pair of swing links in a desired adjusted position.

18. The invention of claim 17, wherein the pivotal connection of said swing plate to the inner pair of parallel swing links is provided by means including friction providing washers providing a manually overcomeable friction force tending to hold said swing plate and said inner pair of parallel swing links in a desired adjusted position.

19. The invention of claim 18, wherein the pivotal connection of said swing plate to the outer pair of parallel swing links includes friction providing washers providing a manually overcomeable friction force tending to hold said outer pair of parallel swing links in a desired adjusted position with respect to said swing plate.

* * * * *